United States Patent [19]

Eichmann et al.

[11] 3,731,120

[45] May 1, 1973

[54] DIGITAL COMPACT CONTROL MODULE

[75] Inventors: Dieter Eichmann, Erlangen; Gunter Heyer, Amberg; Ulrigh Schaff, Erlangen; Gunter Voigt, Karlsruhe, all of Germany

[73] Assignee: Siemens Aktiengesellschaft, Berlin, Munich, Germany

[22] Filed: Mar. 29, 1971

[21] Appl. No.: 128,688

[30] Foreign Application Priority Data

Apr. 2, 1970 Germany....................P 20 15 639.2

[52] U.S. Cl. ..................307/213, 307/218, 307/270, 330/22

[51] Int. Cl. ..........................................H03k 19/08

[58] Field of Search......................307/215, 218, 270, 307/303, 213; 330/22

[56] References Cited

UNITED STATES PATENTS 3,522,446 8/1970 Kodama ..............................307/270
3,579,272 5/1971 Foss ....................................307/215
3,564,439 2/1971 Rao .......................................330/22
3,546,484 12/1970 Fowler ..................................330/22

*Primary Examiner*—James W. Lawrence
*Assistant Examiner*—Harold A. Dixon
*Attorney*—Curt M. Avery, Arthur E. Wilfond, Herbert L. Lerner and Daniel J. Tick

[57] ABSTRACT

A compact module with several AND or NAND stages, designed as a monolithic integrated circuit, comprises a fully integrated current feeder circuit, consisting of a transistor-resistor combination which can be connected to the supply voltage source, and is coupled to all gates of each control module. In order to expand the permissible range of the operating and control voltages of the gate circuit elements, at least a portion of the associated, current-determining resistance is replaced by regulating transistors, on the collector-emitter circuits of which a constant current is impressed in each case as a function of a voltage taken from the transistor-resistor combination of the current feeder circuit.

14 Claims, 2 Drawing Figures

DIGITAL COMPACT CONTROL MODULE

Our invention relates to digital compact control modules with monolithic integrated circuits, whose operating and control voltages can be varied over a wide range and in which the current-determining resistors are largely replaced by transistors in order to save chip area.

In solid-state control and regulating technology, digital compact control modules with monolithic integrated circuits are used for the design of logic circuits as well as of entire control systems to an increasing extent. These control modules are extremely small and contain as a rule several independent gate circuits, for instance, AND or NAND gates each with several inputs and at least one output, in integrated circuit design. The number of the individual gates within such a module can vary and depends on the required number of input terminals per gate. Because of the small dimensions of such compact control modules, the number of externally accessible terminals cannot be increased indefinitely, especially since not only the input terminals but also the output terminals and the current supply terminals must be brought out and made accessible. Within the module are integrated active switching elements (transistors) as well as inactive ones (diodes) and furthermore current-determining resistors. In the design of monolithic integrated circuits, especially for higher operating voltages, the seemingly irreconcilable contradiction occurs of having to use on the one hand, for technological reasons, the lowest possible resistance total for the current-determining resistors which are to be integrated and on the other hand, of keeping the power loss as low as possible.

From the experience with known integrated circuits an economically optimal size has been found for the semiconductor chip which contains the active circuit of the entire control module. Exceeding this optimum chip area means not only greater consumption of the semiconductor material but also a smaller degree of utilization of the facilities required for the individual process steps and above all, lower yield. The cost of an acceptable chip therefore increases substantially with increasing area.

A diffused resistor of medium size, for instance, of several tens of kohm, occupies more space in integrated circuit design and is therefore more expensive than a transistor or a diode. This situation thus requires a change in thinking in the design of integrated circuits as compared to the conventional discrete technique where one attempted to get along with the lowest possible number of semiconductor elements.

A diffused resistor of about 5 kohm occupies on a chip about the same area as a 10 mA npn transistor. For true control transistors, i.e., transistors which have to process still considerably smaller currents, the required chip area is again reduced by a factor of about 3. A circuit suitable for the integration of a plurality of gates on a single chip therefore shows preferably a relative large number of semiconductors with a small resistance total. The requirement of a small resistance total for the current-determining resistors now creates a new problem, as it is not possible, in view of the power loss, to keep the resistance values required for the current-determining resistors as small as would be desirable for technological reasons. Special difficulties arise if it is required to operate the module or modules realized with the monolithic technique over a relatively wide range of supply voltages, for instance, with operating voltages between 11 and 30 V, where the input control voltages required for the operation of the modules must lie in approximately the same voltage range. This relatively large voltage range that must be handled results in considerable variations of the power loss as the power loss, as is well known, increases with the square of the voltage, i.e., $P = U^2/R$ ($P$: power loss, $U$: voltage, $R$: resistance).

It is an object of our invention to devise a control module generally of the above-mentioned type, in which the power loss of the overall circuit exhibits no longer square-law dependence on the operating and control voltages within the wide range of variation of these voltages.

Another object of this invention is to provide an integrated circuit in which inadvertent short circuits do not damage the integrated circuitry.

Yet another object of our invention is to provide an integrated circuit in which the chip size is relatively small and the chip is easy and economical to manufacture.

Still another object of our invention is to provide in an integrated circuit means to block inadvertent noise and spurious signals.

Another object of this invention is to provide in an integrated circuit means for preventing breakdown of the semiconductors therein due to spurious large voltage signals.

Yet another object of our invention is to provide in an integrated circuit means for preventing damage to the circuit if a short circuit occurs in the output circuit thereof.

Other objects, advantages and features of the invention will become more apparent from the following description.

To achieve these objects, we have based our invention on the recognition of the fact that a linear increase of the power loss with the voltage ($P = I \cdot U$) can be obtained by impressing a constant current.

In a digital compact control module with monolithic integrated circuitry with several gate circuits independent of each other, particularly AND or NAND stages, which each have a plurality of inputs and at least one output, for solid-state control and regulating systems, the invention accordingly requires that there be associated with all gates of each control module (in common) an integrated current feeder circuit consisting of a transistor-resistor combination which can be connected to the supply voltage source. Furthermore, for expanding the permissible range of the operating and control voltages of the gate circuit elements, at least part of the associated current-determining resistors are replaced by regulating transistors, in the collector-emitter circuits of which a constant current is impressed in each case as a function of a voltage taken from the transistor-resistor combination of the current feeder circuit.

Constant-current sources are known in analog technology for differential input stages in order to keep the current drift small, as may be seen from the paper by Bladowski, "Linear Monolithic Integrated Circuits (LMIS)", published in the magazine Orbit of November, 1968, Article Part II, p. 7 ff. The use of the constant-current sources in digital integrated compact control modules makes it possible to keep the integrated resistance total and the required active semiconductor chip area small by largely replacing the current-determining resistors with transistors, thereby obtaining a linear increase of the power loss with the voltage on the basis of impress a constant current.

If each gate of the compact control module consists of several circuits, for instance, an input circuit, an output circuit and possibly further intermdiate circuits such as, for instance, blocking circuits or threshold circuits for interference signals below or, for short periods, above threshold, it is desirable to carry out the replacement of resistors with transistors and the impressing of constant-current in all of these circuits.

The current feeder circuit with the constant-current source needs to be available only once in each control module for all the gates located therein in common.

According to another feature of our invention, the transistor-resistor combination of the current feeder circuit of each module consists of transistors which are connected to current supply terminals with their collector-emitter paths in series with divider resistors. The base of the transistor on the operating-potential side is connected to a voltage divider consisting of transistors which are connected to the current supply terminals, and the base of the transistor on the reference-potential side is connected to the collector of that transistor, the emitter-base path of which makes available the control voltage for impressing the constant current for the transistors which replace the resistors, for the transistors of the input circuit, for the transistor of the threshold circuit and for the transistors of the output circuit of the control module.

According to another feature of out invention, the input circuit of each gate consists of a number of transistors matched to the number of inputs, the bases of which are connected to respective inputs and the collectors of which are connected in common via a diode to a junction point which is connected via a cascaded Zener diode, to the reference potential. In addition, if required, the junction point is connected to the operating potential via a diode with conducting polarity for the operating potential of the current supply. The emitters of the transistors are connected to the reference potential via one collector-emitter path each of the constant-current regulating transistors and, via one diode each, to a nodal point which is connected to an auxiliary potential via a resistor and via a transistor combination to a further auxiliary potential of the current feeder circuit, and furthermore, constitutes the output of the input circuit or the input of the threshold circuit, respectively.

The threshold circuit consists preferably of a switching member with two transistors, the emitters of which are jointly connected, via a further constant-current regulating transistor, to the reference potential. The base of one of the transistors is connected to the output of the input circuit, the base of the other transistor to an auxiliary potential of the current feeder circuit, the collector of one transistor is connected to another auxiliary potential of the current feeder circuit and the collector of the other transistor forms the output of the threshold circuit or the input of the output circuit, respectively, via a transistor combination.

The output circuit contains preferably output transistors cascaded in a totem pole circuit configuration in which the base resistors are replaced in at least one of the transistor cascades by a transistor combination which is connected to the reference potential via a constant-current regulating transistor.

For limiting the short circuit current of the output circuit, it is desirable to insert into the collector circuit of the transistor cascade on the operating-voltage side and into the emitter circuit of the transistor cascade on the reference voltage side an auxiliary resistor each, the voltage drop of which, which is proportional to the load current, is fed in each case as the control quantity to the base of an auxiliary transistor, the collector of which is connected, possibly via a further transistor, to the base of the associated transistor cascade.

According to a further feature of the invention, the output of the output circuit is connected on the one side to the operating potential and on the other side to the reference potential via a diode with a blocking polarity.

With the constant-current transistors replacing the base point resistors are preferably associated, on the reference potential side, resistors by means of which the magnitude of the current of the regulating transistors can be preset. The same effect can also be achieved, if desired, through different size, and therefore different path resistances of the transistors.

In the train of the module circuitry, preferably between the input circuit and the threshold circuit, may be provided a delay circuit which holds back or blocks, respectively, above-threshold spurious or noise signals of short duration. This delay circuit may contain an R-C combination, the resistance members of which are replaced entirely or partially by transistors or transistor combinations, respectively.

The invention will be more fully described by way of example with reference to the accompanying drawings, illustrating a preferred embodiment of the apparatus according to the invention.

Figure 1:
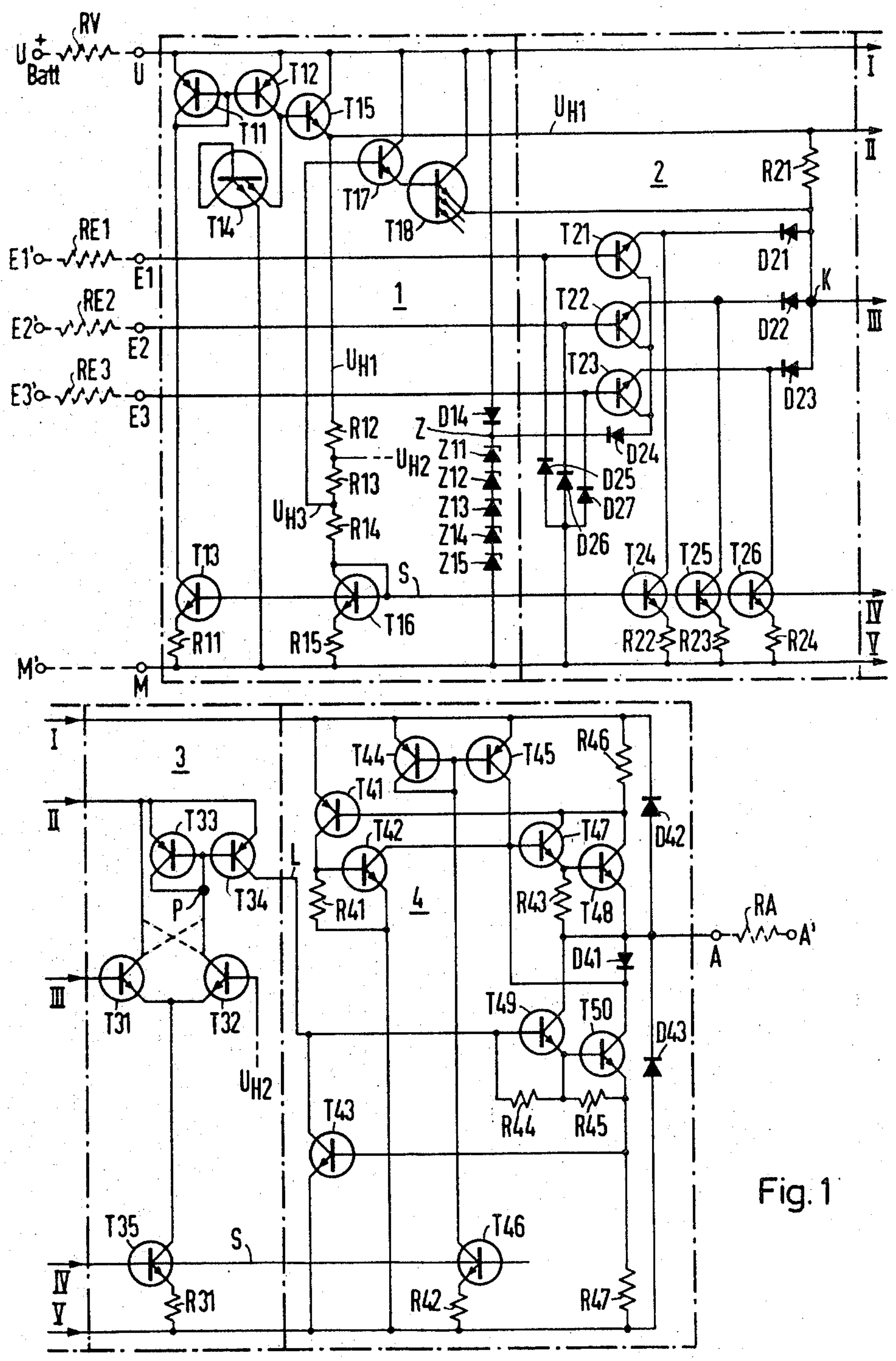
FIG. 1 is a schematic diagram of a logic circuit in accordance with our invention which advantageously may be built as an integrated circuit.

FIG. 1 shows the circuit diagram of a digital compact control module, specifically, that of an AND or NAND gate, respectively, with inputs E1 to E3 and an output A. Each gate, of which always several can be accommodated in one control module, is composed of an input circuit 2 and an output circuit 4, between which further circuits, for instance, a threshold circuit 3, may be provided. A current feeder circuit 1 is coupled to all gates of the module in common. All components of the gates and the gate circuits are accommodated on one chip in a monolithic integrated circuit design.

For the sake of clarity, the circuits 1 to 4 are separated from each other in the circuit diagram of the drawing by vertical, dash-dotted lines. The operating voltage for the current supply of the module is applied at the terminals U and M, of which U represents the operating (positive) potential and M the reference (ground) potential. In order to supply the module with current, the terminal U is connected via an externally inserted series resistor RV with the positive terminal of the operating voltage source $U_{Batt}$, while the terminal M is connected to the negative terminal M' of that source.

The input terminals E1 to E3 of each gate located in the module are preferably connected with the respective input terminals E1' to E3' via externally connected series resistors RE1 to RE3. The output terminal A is connected via an externally connected output resistor RA with the output terminal A'.

The current feeder circuit 1, coupled to all gates of each module in common, consists essentially of a transistor-resistor combination in series which includes transistors T15, T16 and divider resistors R12 to R14. In this transistor-resistor combination, the collector of T15 is connected to the operating potential terminal U, while the emitter of transistor T15 is connected, via the series-connected divider resistors R12 to R14, to the collector of the transistor T16, the collector-base path of which is short circuited, and the emitter of which is connected to the reference potential terminal M via a resistor R15. The base of the transistor T15 is connected to the reference potential M via the transistor T14 which functions as a Zener diode with a series-connected diode in the emitter-base path connected as a Zener diode. The base of the transistor T15 also is connected to the operating potential U via a transistor combination T11 and T12 functioning as a base resistor substitute, as well as to the reference potential M via the collector-emitter path of a transistor T13 and the series resistor R11.

By the transistor T14, functioning as a Zener diode substitute, there is formed at the emitter of the transistor T15 a constant voltage which produces a constant current in the divider resistors R12 to R15 and therefore in the collector-emitter circuit of the transistor T16. The voltage drop S across the emitter-base path serves as the base control voltage for the transistors T13 and T16 of the current feed circuit which replace the base point resistors as well as of the corresponding transistors of the other gate circuits of the module. The emitter-base voltage S of the transistor T16 thereby impresses a constant current in each of the collector circuits of the above transistors.

The input terminals E1 to E3 of each gate are connected in the input circuit 2 to the bases of transistors T21 to T23, the number of these transistors being matched to the number of the inputs. The collectors of transistors T21 to T23 are joined and connected to a point Z of the current feeder circuit 1 via a diode D24; this point Z is connected, on the one hand, with the terminal U of the module via the diode D14 which has passing polarity for the supply voltage U, and on the other hand to the reference potential M via cascaded Zener diodes Z11 to Z15. The sum of the voltages of the Zener diodes Z11 to Z15 is somewhat larger than the maximally occurring supply voltage $U_{Batt}$. The emitters of transistors T21 to T23 of the input circuit 2 are each connected to the reference potential M via the collector-emitter paths of regulating transistors T24 to T26 and series resistors R22 to R24, respectively, which replace the base point resistors and the bases of which are all connected to the voltage S. The emitters of transistors T21 to T23 are connected to the nodal point K, each via a diode D21 to D23, respectively.

This nodal point is connected to the auxiliary potential $U_{H1}$ of the current feeder circuit 1 via a resistor R21, and to the auxiliary potential $U_{H3}$ of the current feeder circuit 1 via the transistor combination T17, T18 of that circuit. The function of transistor combination T17, T18 will be explained below and contains a transistor T18 which has several emitters with the nodal point of each gate connected to one of the emitters of the transistor T18, while the nodal points K of the other gates of the same module are connected to respective ones of the other emitters of the transistor T18. The nodal point K constitutes in each case the output of the gate input circuit 2 or the input of the following threshold circuit 3, respectively.

The threshold circuit 3 contains a switching member consisting of two transistors T31 and T32, the emitters of which are joined and are connected to the reference potential M via the collector-emitter path of the constant-current transistor T35, and a series resistor R31, the base of the transistor T35, which replaces the base point resistor, also receiving the voltage S. The base of transistor T31 is connected with the nodal point K of the input circuit 2, and the collector of transistor T31 is connected to the auxiliary potential $U_{H1}$ of the current feeder circuit 1. The base of transistor T32 is connected to the auxiliary potential $U_{H2}$ of the current feeder circuit 1, while the collector of transistor T32 is connected, via a transistor combination T33 and T34 to the auxiliary voltage $U_{H1}$ of the current feeder circuit 1 and with the output line L of the threshold circuit 3.

The gate output circuit 4 contains cascaded output transistors T47 and T48 and T49 and T50 in a totem pole configuration. The collector of transistor T48 is connected via an auxiliary resistor R46 to the operating voltage source U, while the emitter of transistor T48 is connected via a diode D41 to the collector of transistor T50. The emitter of transistor T50 is connected via an auxiliary resistor R47 to the reference potential terminal M. The collector of the precontrol transistor T47 is connected with the collector of the transistor T48, while the emitter of precontrol transistor T47 is connected with the base of transistor T48 and via an emitter resistor R43, to the emitter of transistor T48, the output A and the collector of the precontrol transistor T49. The emitter of transistor is connected with the base of transistor T50 as well as, via a resistor R45, to the emitter of transistor T50 and, via a resistor R44, to the base of transistor T49.

The base of the transistor T47 is connected with the collector of transistor T50 and to the operating potential U via a combination of transistors T44 and T45, which replace the base resistor, and also to the reference potential M via the collector-emitter path of a constant-current transistor T46. The base of transistor T46 is influenced by the control voltage S. The base of the transistor T47 also is connected with the collector of an auxiliary transistor T42, the emitter of which is at the reference potential M. The base of transistor T42 is connected to its emitter via a resistor R41 and is connected via the collector-emitter path of an auxiliary transistor T41 to the operating potential U. The base of transistor T41 is connected with the collectors of the transistors T47, T48. The base of transistor T49 is connected via the collector-emitter path of a transistor T43 to the reference potential M and with the output line L of the threshold circuit 3. The base of transistor T43 is connected with the emitter of the transistor T50.

The auxiliary resistors R46 and R47 of the output circuit 4 in conjunction with the transistors T41, T42 and T43, respectively, serve to limit the short circuit current of the output circuit in the following manner. As soon as the voltage drop across the resistors R47 and R46, respectively, are saturated and draw control current away from the base circuits of the cascaded transistor T49, T50 and T47, T8, respectively.

The output A of the output circuit 4 is connected via diodes D42 and D43 respectively having polarities in the cutoff direction, to the operating potential U and to the reference potential M.

The gate inputs E1 to E3 of the input circuit 2 also contain protective diodes D25 to D27, each of these diodes being connected with cutoff polarity between the input E1, E2, and E3, respectively, and the reference potential M.

With the constant-current transistors T13, T16, T24 to T26, T35 and T46 are associated on the preference potential side small resistors R11, R15, R22 to R24, R31 and R42, by means of which the magnitude of the current of the constant-current transistors can be preset.

The operation of the circuit arrangement and the special features thereof will be set forth in greater detail.

In the current feeder circuit 1 is generated, via transistor T15 and transistor T14, which is connected as a Zener diode with a passing diode, a constant voltage $U_{H1}$ which is present at the emitter of the transistor T15. The constant current flowing in the transistor-resistor combination T12, R12 to R15, T16 due to the constant voltage $U_{H1}$ at the emitter of the transistor makes it possible to derive the constant auxiliary voltages $U_{H2}$ as well as $U_{H3}$ from the transistor-resistor combination at the divider resistors R12 to R14. The fundamentally necessary base resistance between the terminal U and the base of the transistor T15 is replaced by the transistor combination T11, T12 and T13. A constant current is impressed on the collector circuit of the transistor T13 which serves as the substitute for the base point resistor and to the base of which is fed the control voltage S which occurs across the emitter-base path of the transistor T16. The voltage S which is at the base-emitter path of the transistor T16 also serves as the base control voltage for the other base point resistor-replacing transistors T24 to T26 of the input circuit 2, of the transistor T35 of the threshold circuit 3 as well as of the transistor T46 of the output circuit 4.

In order to prevent uncontrollable breakdown of semiconductor paths in the event of pulse-like overvoltages, "safety breakdown points" are built into the circuit. Positive overvoltages at the inputs E1′ or E1, E2′ or E2 and E3′ or E3, respectively, are shunted via the base-collector paths of the transistors T21 to T23 of the input circuit 2 and the Zener diode cascade Z11 to Z15 of the current feeder circuit 1. Negative overvoltages at the inputs, on the other hand, are shunted to the reference potential M via the diodes D25 to D27 of the input circuit 2. To protect the semiconductor paths mentioned, each input E1 to E3 has a series resistor RE1 to RE3, which is not included in the integrated part of the circuit. The output of each gate circuit is protected by the overflow diodes D42 and D43, respectively, and the external resistor RA. Positive supply voltage spikes at the terminal U are shunted to the reference potential M via the diode D14 and the Zener diode cascade Z11 to Z15 of the current feeder circuit 1, while negative voltage spikes are shunted to the reference potential M via the diodes D42, D43 of the output circuit 4. Through these measures adequate protection of the sensitive semiconductor elements of every gate circuit of the module against overvoltages is assured.

Moreover, the following additional measures have been taken for the safety of the module: In order to assure, for instance, safety against open conductors and short circuits to ground at the inputs E, each gate of the module operates with active addressing through positive input voltages, i.e., the control current flows into the input. The base-emitter paths of transistors T21 to T23 of the input circuit 2 serve to prevent reverse current flow for 0 volts at the inputs. With each input E is also associated a base point resistance (replaced by the transistors T24 to T26) in order to keep the inputs E at low impedance and to assure a zero signal at the input in the event of an open conductor at the input. If a logic null is present at one of the inputs E1, E2, E3, the nodal point K is also pulled down to a low potential, and the current drawn from the auxiliary voltage source $U_{H1}$ of the current feeder circuit 1 and conducted via the resistor R21 flows to the reference potential M via the associated base point resistance, i.e., via transistors T24, T25, T26. If a positive control voltage is applied to the inputs E1 to E3, and if this voltage rises at all inputs, the voltage is also lifted at the nodal point K of the input circuit 2 until ultimately the threshold level of the threshold circuit 3 is reached, the current through the resistor R21 serving to provide a voltage for the threshold circuit 3. The diodes D21 to D23 of the input circuit 2 are decoupling diodes of the individual inputs E1 to E3.

If, for instance, 0 V is applied to the input E3′ or E3, repectively, 0 V would also be present at the base of transistor T23 and the collector voltage at transistor T26 would drop. In this event, i.e., only if one or several of the inputs carry a null signal, does the transistor combination T17, T18 of the current feeder circuit 2 supply the necessary operating voltage for transistors T24 to T26. If however, positive voltage is present at the inputs or if the voltage at the inputs E1 to E3 rises, the auxiliary branch is decoupled from the transistors T17, T18. If the inputs E1 and E2 already have positive control potential and the voltage at the input E3 rises, current is shunted via the resistor R21, the nodal point K, the diode D23 and the collector-emitter path of the transistor T26. Only when the voltage at the nodal point K is larger than the auxiliary voltage $U_{H2}$ is the input voltage decoupled by the diode D23, then in a blocking state, and transistor T31 of the threshold circuit 3 is addressed. In this event the switching element of the threshold circuit 3 switches over, transistor T31 becomes conductive while transistor T32 is cut off. If transistor T32 is cut off, transistors T33 and T34 of the threshold circuit are also cut off and no current flows via the output line L to the output circuit 4. This means that transistors T49 and T50 of the output circuit 4 are also cut off and the output A carries a positive output signal. If therefore all three inputs E1 to E3 are high, the output A is also high, which corresponds to the basic concept of an AND gate.

If no voltage is present at the inputs E1 to E3, i.e., the inputs are not switched on, there will nevertheless be 0 volts at the inputs E1 to E3 via transistors T24 to T26 (open conductor case). Thus, it is assured that in the case of an open conductor or short circuit or short to ground (inputs E1 to E3 at M potential) a definite output signal always appears at the output A of the gate.

The base point resistors of the input circuit 2 are not made as resistors in the ordinary sense but, as already explained, as constant-current transistors T24 to T26, onto the collector-emitter circuits of which constant currents are impressed. The magnitude of these current can be preset by means of the small resistors R22 to R24 or can be determined by different path resistances of the transistors.

A constant base-point resistor in lieu of each of the constant-current transistors T24, T25 or T26, respectively, as provided, would have considerable disadvantages, as the low impedance level at each input, which is desirable for reasons of spurious signal susceptibility, cannot be realized because of the high power loss caused thereby. In addition, a high resistance to be provided at this point, with the required tolerances, would require so much area on the semiconductor chip, at ten inputs per chip, that integration of the entire circuit would become uneconomical: Ten input base point resistors of about 30 kohm each would make a total of 300 kohm for the inputs alone. On the other hand, a resistance total of about 150 to 200 kohm might still make it possible to economically integrate. It is true that by reducing these input resistances to 15 kohm each an integrable resistance total of 150 kohm could be attained, but this step would result, with an assured maximum operating voltage of 30 V ($U_{Batt}$), in a power loss of 600 mW at the inputs alone. Only replacing the resistors, particularly the base point resistors, by small constant current-carrying control transistors is the space requirement on the chip reduced to such an extent by the resistor replacement that the concept provided for the gate design can be considered as suitable for integration. The constant input current occurring here, which is independent of the magnitude of the signal voltage at the input, assures the additional advantage of a more rapid decay of spurious voltages because the discharge no longer takes place exponentially as when constant resistors are used, but follow a straight line. The input resistance therefore decreases linearly with decreasing voltage.

The threshold circuit 3, inserted between the input circuit 2 and the output circuit 4, forms the static threshold level for each gate. As long as the potential at the base of transistor T31 is lower than the constant potential $U_{H2}$ of the current feeder circuit 1 present at the base of transistor T32, transistor T32 carries current which is maintained constant by the constant-current transistor T35. Transistor T35 replaces the base point resistor. The current in transistor T32 is fed through reflection at the auxiliary voltage source $U_{H1}$ of the current feeder circuit 1 by means of transistors T33, T34 to the inverting output circuit 4, which carries a zero signal at the output A. If the potential at the base of transistor T31 of the threshold circuit 3 exceeds the set threshold value, the switching member consisting of transistors T31, T32 switches state, and transistor T31 now carries current. In this case, the output circuit 4 is not energized and the output A of the output circuit 4 carries a signal voltage. This mode of operation corresponds to that of an AND gate. If, however, the signal states at the output A of the output circuit 4 are made complementary to this, i.e., a NAND gate is formed, it is merely necessary to interchange the collector connections of transistors T31 and T32 of the threshold circuit 3, as indicated by dashed lines, i.e., to connect the collector of transistor T32 with connecting line to the auxiliary potential $U_{H1}$ and to connect the collector of transistor T31 to the point P of the transistor combination T33, T34.

The transistor combination T33, T34 of the threshold circuit 3, in the version shown by the solid lines, is to also pass the current, which flows through transistor T32, through transistor T33 and through transistor T34, but in the opposite direction. Thus, the current from the transistor combination T33, T34 can be used via the output line L for energizing the output circuit 4, and this current also is therefore independent of the operating voltage $U_{Batt}$, which can vary over the range 11 to 30 V.

The output circuit 4 consists of a low-impedance dual-transistor circuit (totem pole circuit), in which however, the base resistor required for addressing the upper transistor cascade with the transistors T47, T48 is replaced by transistors T44 to T46. In this manner, an advantage regarding power loss can be achieved, in addition to savings of chip area through the use of the constant-current transistor T46, the collector-emitter circuit of which also carries a constant current independent of the supply voltage. A constant base point resistor in lieu of transistor T46 would have had to be designed to feed the upper cascade with the transistors T47, T48, and at the maximum permissible supply voltage ($U_{Batt}$ = 30 V) a constant resistance would then result, with transistor T50 saturated at too large a current value (current ratio 1 : 30, power loss ratio 1 : 900).

In order to make the output A of the output circuit 4 short circuit proof and to protect the preceding transistors against damage which might occur in the event of short circuits between the output A and the operating voltage U or the reference voltage M, respectively, the auxiliary resistors R46 and R47 are provided, the voltage drop of which is compared with the base-emitter voltage of the transistors T41 and T43, respectively. These transistors are energized upon reaching the maximum output current and draw control current away from the transistor cascade T47, T48; T49, T50.

Figure 2:
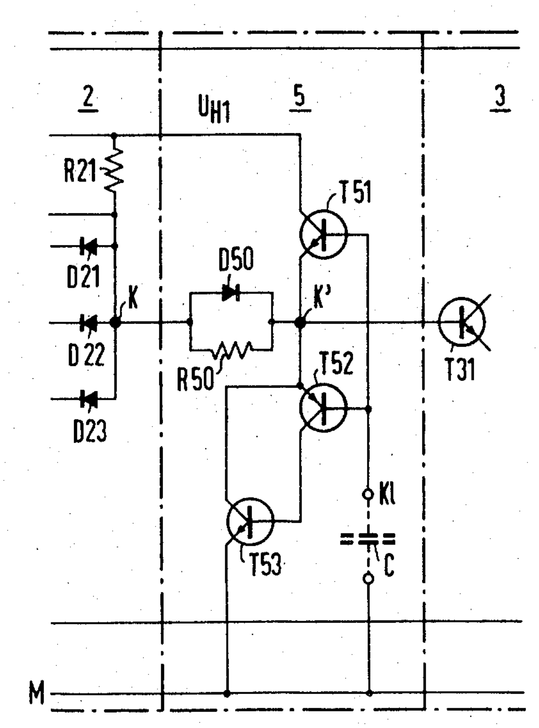
FIG. 2 is a schematic diagram of a time delay circuit which may be used with the circuit of FIG. 1 to block inadvertent noise or interference signals of a predetermined duration.

If required, there can be provided between the input circuit 2 and the threshold circuit 3 a delay circuit 5, which holds back or blocks, respectively, above-threshold interference, spurious (or noise) signals of short duration. FIG. 2 illustrates an example of implementation for this.

Between the nodal point K of the input circuit 2 and the base of the transistor T31 of the threshold circuit 3, a diode 50 with the shunt resistance R50 is provided. The nodal point K' on the output side is connected to the auxiliary potential $U_{H1}$ of the current feeder circuit 1 via the emitter-collector path of a transistor T51 and to the reference potential M via the emitter-collector path of a transistor T52 and the base-emitter path of a transistor T53, the collector of which is connected with the emitter of transistor T52, while the joined bases of transistors T51 and T52 are brought out to an external terminal K1 of the module. Between the terminal K1 and the reference potential M can be connected, externally to the module, a capacitor C, which determines the delay time.

While the invention has been described by means of specific examples and in specific embodiments, we do not wish to be limited thereto, for obvious modifications will occur to those skilled in the art without departing from the spirit and scope of the invention.

We claim:

1. A digital compact control module comprising a monolithic integrated circuit comprising at least one independent logic gate, each of said logic gates comprising a plurality of inputs and at least one output, a supply voltage source having first and second terminals for supplying voltage to said module, an integrated current feeder circuit means connected between said supply voltage and all of said gates, a plurality of regulating transistors functioning as current determining resistors and having respective collector-emitter circuits, means for impressing upon said collector-emitter circuits constant currents, said integrated feeder circuit means being connected to said means for impressing said constant current, the magnitude of said constant current being dependent upon the control voltage level produced by said integrated current feeder circuit means, said output circuit comprising output cascaded transistors arranged in a totem pole configuration, the base resistors of at least one of the cascaded transistors being simulated by a transistor combination connected to the second terminal via a respective constant-current regulating transistor.

2. A digital module as set forth in claim 1, comprising means for limiting the short circuit current of the output circuit which comprises first and second auxiliary resistors, said first auxiliary resistor being inserted into the collector circuit of the cascaded transistors, said second auxiliary resistor being connected in the emitter circuit of the cascaded transistors of the totem-pole output circuit, the voltage drop through each of said auxiliary resistors being proportional to the load current and forming a control signal.

3. A digital module as set forth in claim 2, comprising output diodes, wherein the output of the output circuit is connected via a respective one of said output diodes arranged in cutoff polarity to the first and second terminals, respectively.

4. A digital compact control module comprising a monolithic integrated circuit comprising at least one independent logic gate, each of said logic gates comprising a plurality of inputs and at least one output, a supply voltage source having first and second terminals for supplying voltage to said module, an integrated current feeder circuit means connected between said supply voltage and all of said gates, a plurality of regulating transistors functioning as current determining resistors and having respective collector-emitter circuits, means for impressing upon said collector-emitter circuits constant currents, said integrated feeder circuit means being connected to said means for impressing said constant current, the magnitude of said constant current being dependent upon the control voltage level produced by said integrated current feeder circuit means, threshold blocking means for preventing noise signals having no greater than a predetermined duration from interfering with the operation of said module, said blocking means being a threshold circuit comprising a switching member with two transistors, the emitters of said two transistors being connected through a respective regulating transistor to the second terminal, the base of the one of said two transistors being connected with the input circuit, first and second auxiliary potentials of said current feeder circuit, the base of the second of said two transistors being connected to said first auxiliary potential, the collector of the one of said two transistors being connected to said second auxiliary potential, and the collector of the second of said two transistors forming the output of the said blocking means.

5. A digital compact control module comprising a monolithic integrated circuit comprising at least one independent logic gate, each of said logic gates comprising a plurality of inputs and at least one output, a supply voltage source having first and second terminals for supplying voltage to said module, an integrated current feeder circuit means connected between said supply voltage and all of said gates, a plurality of regulating transistors functioning as current determining resistors and having respective collector-emitter circuits, means for impressing upon said collector-emitter circuits constant currents, said integrated feeder circuit means being connected to said means for impressing said constant current, the magnitude of said constant current being dependent upon the control voltage level produced by said integrated current feeder circuit means, threshold blocking means for preventing noise signals having no greater than a predetermined duration from interfering with the operation of said module, said input circuit of each gate comprising a number of transistors equal to the number of inputs of said input circuit, the bases of said number of transistors being connected to the respective inputs, the collectors of said number of transistors being connected together, a diode, a plurality of cascaded Zener diodes connected between said second terminal and said diode, a second diode connected between said first terminal and said diode and having a passing polarity for the supply voltage, and the emitters of said number of transistors being connected through respective ones of said regulating transistors to the second terminal and through respective diodes to said blocking means.

6. A digital module as set forth in claim 5, comprising a plurality of additional diodes, wherein each of the inputs of the input circuit is connected to the second terminal potential via a respective one of said additional diodes being arranged in cutoff polarity for the input voltage potential.

7. A digital compact control module comprising a monolithic integrated circuit comprising at least one independent logic gate, each of said logic gates comprisimg a plurality of inputs and at least one output, a supply voltage source having first and second terminals for supplying voltage to said module, an integrated current feeder circuit means connected between said supply voltage and all of said gates, a plurality of regulating transistors functioning as current determining resistors and having respective collector-emitter circuits, means for impressing upon said collector-emitter circuits constant currents, said integrated feeder circuit means being connected to said means for impressing said constant current, the magnitude of said constant current being dependent upon the control voltage level produced by said integrated current feeder circuit means, and delay means for blocking noise signals of a predetermined duration.

8. A digital module as set forth in claim 7, comprising resistor means connected to respective ones of said regulating constant-current transistors for controlling the magnitude of the current of the respective regulating transistors.

9. A digital module as set forth in claim 7, wherein the delay means comprises an R–C combination, the R components of the R–C combination being simulated by active elements.

10. A digital module as set forth in claim 7, wherein said integrated current feeder circuit comprises first transistor means and a voltage divider, said voltage divider comprising a plurality of series connected resistors connected to said supply voltage through a second transistor means.

11. A digital module as set forth in claim 10, wherein said first transistor means of said current feeder circuit of each module comprises first and second transistors connected to said first and second terminals, the emitter of the first transistor being connected with said voltage divider, the collector of said first transistor being connected with said first terminal, the base and collector of the second transistor being joined, the emitter-base path of said second transistor providing the control voltage for impressing constant current on said regulating transistors and within said module.

12. A digital module as set forth in claim 7, wherein said delay means prevents noise signals having no greater than a predetermined duration from interfering with the operation of said module.

13. A digital module as set forth in claim 12, wherein said module has input and output circuits and said blocking means is connected between said input and output circuits.

14. A digital module as set forth in claim 12, wherein said blocking means blocks signals having a magnitude greater than a preset threshold level.

* * * * *